INVENTORS
HAROLD H. KOPPEL
JOHN C. MARTIN
ANTON J. STILIN
BY John F. Luhrs
ATTORNEY INVENTORS
HAROLD H. KOPPEL
JOHN C. MARTIN
ANTON J. STILIN
BY
John F. Ruhes
ATTORNEY

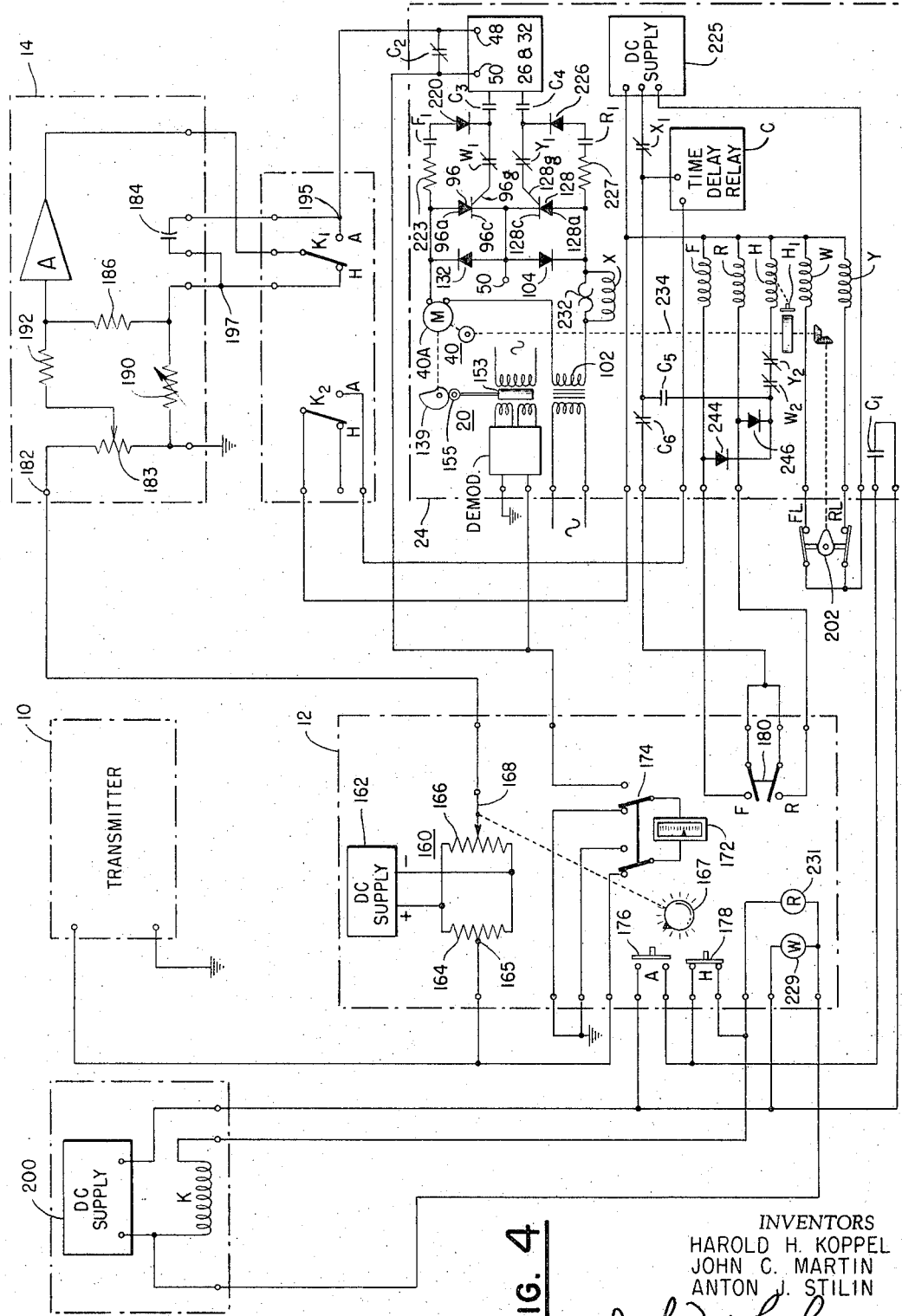

United States Patent Office 3,369,160
Patented Feb. 13, 1968

3,369,160
CONTROL DEVICE EMPLOYING MANUAL-AUTOMATIC SYSTEMS
Harold H. Koppel, Cleveland, John C. Martin, Wickliffe, and Anton J. Stilin, Willoughby, Ohio, assignors to Bailey Meter Company, a corporation of Delaware
Filed Jan. 2, 1964, Ser. No. 335,065
10 Claims. (Cl. 318—18)

ABSTRACT OF THE DISCLOSURE

A control circuit for a motor-operated control drive incorporating an amplifier producing an error signal proportional to the difference between a control signal and a signal corresponding to drive position which controls the forward and reverse rotation of the motor and including manually operable means for transferring control of the motor from the error signal to manually operated means.

---

This invention relates to an electronic circuit for controlling a servo-motor such as an electrically operated control drive used to position valves, dampers and the like.

During the past several years, there has been considerable progress in the field of analog electronic control. The Control Engineer has at his disposal a complete selection of electronic components for measurement of variables and all other system components except the final servo-motor or control drive. As to the control drive, the progress shown in the development of other system components has not been evident. Prior to our invention the Control Engineer often resorted to converting the control signal from an electric to a pneumatic signal and then employing pneumatically operated drives. Many of the advantages gained by electronic control were lost merely for the lack of an acceptable electrically operated control drive.

In developing an electrically operated control drive many specifications had to be met. An acceptable drive must be sensitive to small signal changes yet stable when a null condition exists. Cost, which is always an important factor, is, in many cases, directly affected by the sensitivity requirement. Travel time from minimum to maximum position must be short or the over-all speed of an electronic control system is lost. Travel time also has a direct effect on the drive stability and a compromise must be reached or circuitry incorporated which satisfies both requirements. Consideration must be given to the operation of an electric drive in the remote manual and automatic modes as well as the transition from one to the other. Finally, the effects of environmental conditions such as temperature must be considered so as to permit operation in a wide variety of applications.

One object of our invention is therefore to provide an electrically operated control drive which is sensitive to small changes in a controlled variable and whose speed is proportional to the magnitude of the error signal representing the difference between the actual value of the variable and a desired value.

Another object of our invention is to provide a circuit for a control drive which is protected against overload currents should the drive be stalled for any reason.

Still another object of our invention is to provide a control drive circuit which transfers from automatic operation to remote manual and vice versa without disturbing the drive position.

A further object of our invention is to provide a circuit for a control drive meeting the demanding specifications of modern highly complex control loops.

Various other objects and advantages will appear from the following description and from the drawings in which.

Figure 3A:
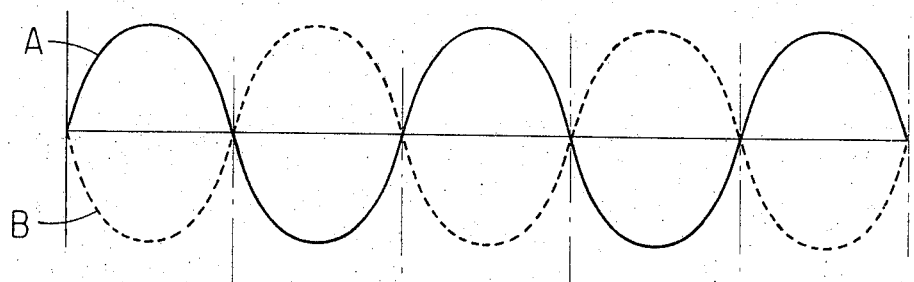
FIG. 3 is a series of plots showing various voltages at selected points throughout the circuit of FIG. 2.
Figure 3B:
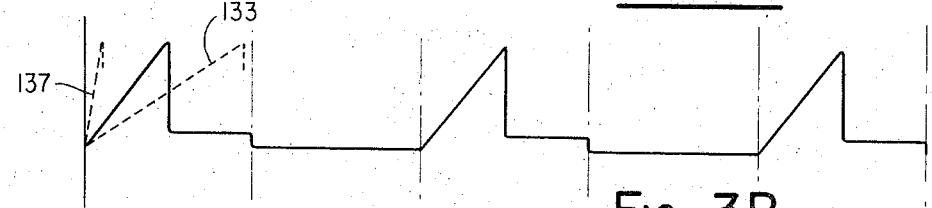
Figure 3C:
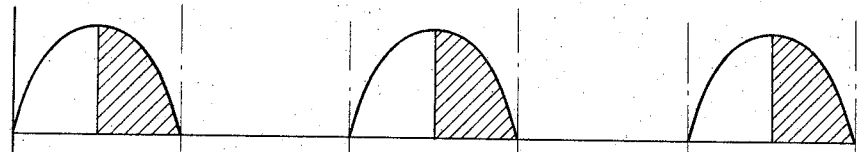
Figure 3D:
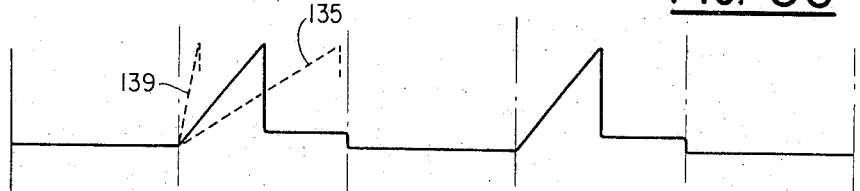
Figure 3E:
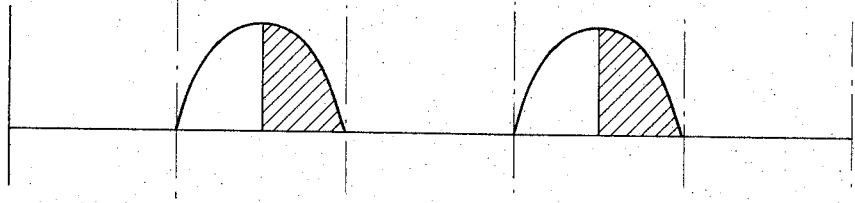

Of these, FIGURES 3A to 3C depict the operation of the circuit when the drive is operated in the forward direction. FIGURES 3A, 3D and 3E depict the operation of the circuit when the drive is operated in the reverse direction.

FIG. 4 is a schematic diagram illustrating various features advantageously incorporated in our control circuit.

The control circuit of our invention incorporates a differential amplifier to amplify the difference between the input or error signal and the drive position or feedback signal. Following the differential amplifier are two identical trigger circuits each arranged to trigger an associated unijunction transistor. One side of this dual arrangement operates the drive in a forward direction and the other in a reverse direction. Each trigger circuit includes its own integrator which controls the firing of the unijunction transistor. When either unijunction transistor fires, a trigger pulse activates one of two silicon controlled rectifiers which in turn energizes the armature winding of a direct current shunt wound motor. Depending on which unijunction transistor is fired and consequently which silicon controlled rectifier is triggered, the drive operates in either the forward or reverse direction.

To protect against destructive overload conditions, the armature current is continuously sensed. If at any time the armature current exceeds 125% of maximum motor rating, a circuit is energized to limit armature current to a safe value. When the motor current returns to nomal, the torque limiting circuit automatically turns off without operator intervention. Another protective means we incorporate is a thermal overload device which de-energizes the motor and trips the control system from automatic to remote manual. This feature protects against a possible system disturbance if the thermal protective device is reset with the control in automatic.

During the normal transfer from remote manual to automatic, we use a time delay relay. In our circuit this relay functions to eliminate "bumping" the drive while the transfer is being effected. When the system is in the remote manual mode of operation the drive position is controlled independent of the amplifier and unijunction trigger circuits. Instead signals are applied directly to the gate electrodes of the silicon controlled rectifiers; drive operation being controlled by controlling the duration of the gate signals.

Figure 1:
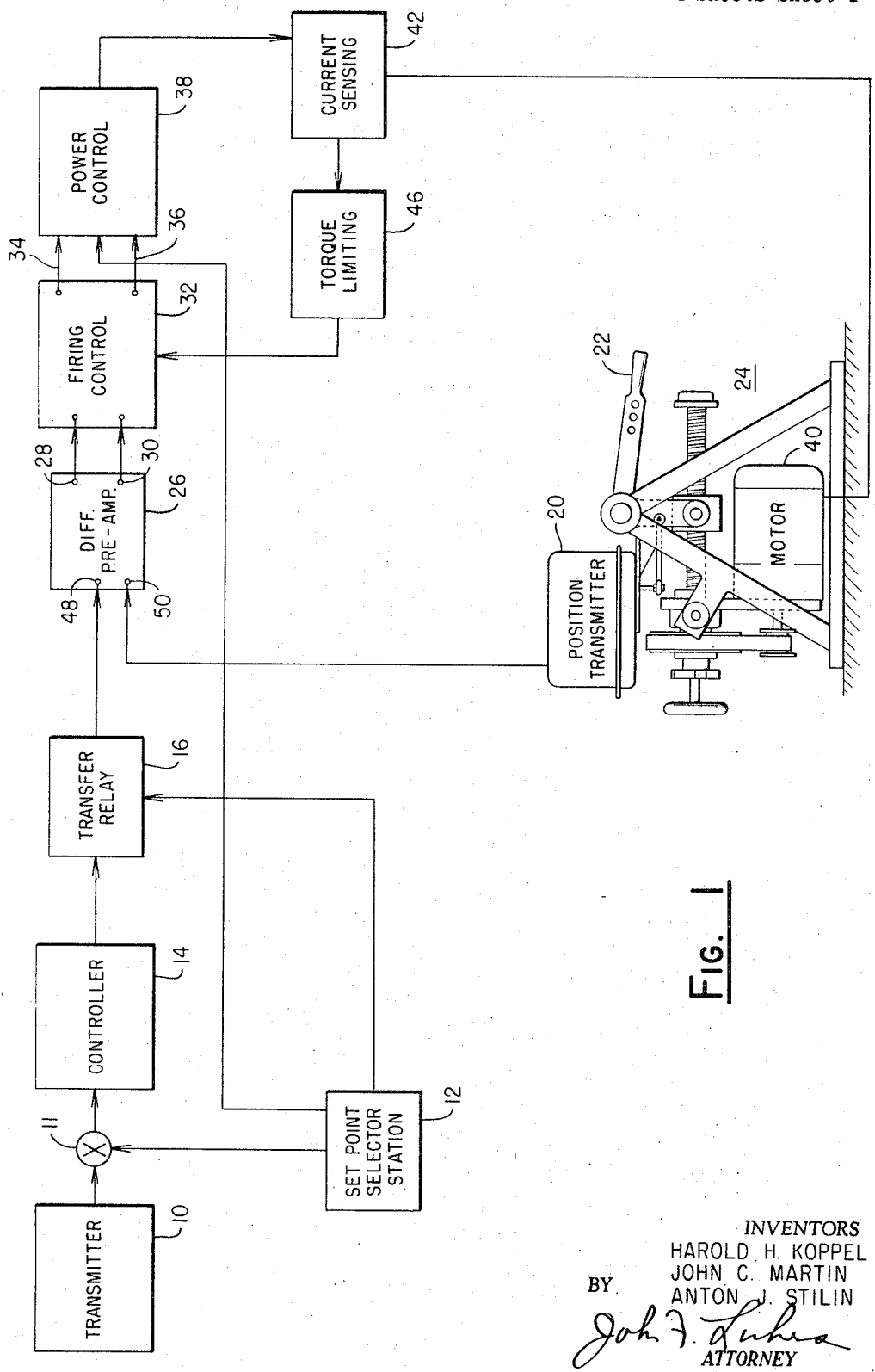
FIG. 1 is a block diagram of a control system which includes our electronic control circuit.

Referring now to FIG. 1, we show a transmitter 10 which generates a DC signal at its output proportional to a measured variable. The particular type of transmitter employed is determined by the variable being measured. For example, if the measured variable is flow, a differential pressure transmitter could be used to measure the pressure drop developed by an orifice or other type of primary element.

The output signal from the electric transmitter 10 is compared in a summing junction 11 with a setpoint signal generated in a Selector Station 12 having an output signal range equal to the signal range generated by transmitter 10. In the system with which our invention was developed a direct current signal range from −10 volts to +10 volts with zero at the mid-point was employed. A more detailed description of Selector Station 12 will be given in reference to FIG. 4.

As mentioned, the output of the transmitter 10 is compared with the setpoint voltage of the Selector Station 12 and the difference, which is designated as an error signal, is transmitted to the input terminal of a controller 14. The controller 14 includes a high gain operational amplifier with an external feedback circuit for characterizing the output signal with respect to the input signal. A complete description of a high gain operation amplifier is given in the application of John C. Martin, Ser. No. 136,278, filed Sept. 6, 1961, now Patent 3,206,691.

With the system in an automatic mode of operation, the output signal from the controller 14 is coupled through a transfer relay 16 to input terminal 48 of a differential preamplifier 26. The transfer relay 16 consists of a multiple contact relay which is energized by a signal from the Selector Station 12 and provides a means for transferring the system from automatic to remote manual or vice versa. In the remote manual mode, the controller output is blocked at transfer relay 16 and the drive is positioned from the Selector Station 12.

Connected to the other input terminal 50 of the differential preamplifier 26 is a position transmitter 20 having an output signal proportional to the position of the output drive arm 22 of an electrically operated control drive 24. A number of devices are available that can be employed as transmitters of drive position; we will illustrate and describe a cam-operated movable core transmitter type.

The position transmitter output is compared with the controller output and the difference amplified in the differential preamplifier 26. A differential amplifier offers many advantages in the preamp stage of a control circuit such as compensation for transistor drift and gain change. The polarity of the output of differential preamplifier 26 depends on whether the position transmitter signal is positive with respect to the controller output signal or vice versa. In one situation output terminal 28 of the differential preamplifier 26 will be positive with respect to output terminal 30 and in the other the reverse will prevail. Depending on the polarity of terminals 28 and 30 one of two trigger circuits of a firing control section 32 will be energized. In turn, the trigger circuit determines whether the electric drive 24 operates in a forward or reverse direction. Firing control section 32 is made up of two identical trigger circuits each controlling a unijunction transistor. One trigger circuit causes forward movement of the drive arm 22 and the other reverse movement. Only one trigger circuit and unijunction transistor is operative at any given time.

When one of the unijunction transistors is triggered, a gate signal is transmitted to a power control section 38 over line 34 or line 36; depending on which one of the two signals at the differential preamplifier 26 is positive with respect to the other. To provide for both forward and reverse operation, the power control section must necessarily contain two identical circuits. Each of these circuits consists of a silicon controlled rectifier gated by a signal from the firing control section 32. Conduction of a silicon controlled rectifier causes direct current to flow through the armature winding of a shunt wound direct current motor 40 positioning the drive arm 22 through a suitable reduction mechanism. Since rotational direction is determined by the polarity of the armature current, one silicon controlled rectifier is polarized to control the forward direction and the other to control the reverse direction.

During energization of the direct current motor 40 a current sensing circuit 42 responds to current flow through the motor 40; should this flow exceed a pre-set limit, about 125% of the motor rating, a signal is transmitted to a torque limiting section 46. The function of the torque limiting section is to shorten the conducting time during each cycle of operation of the unijunction transistors in the firing control section 32 to limit the armature current to about 125% of maximum.

Figure 2:
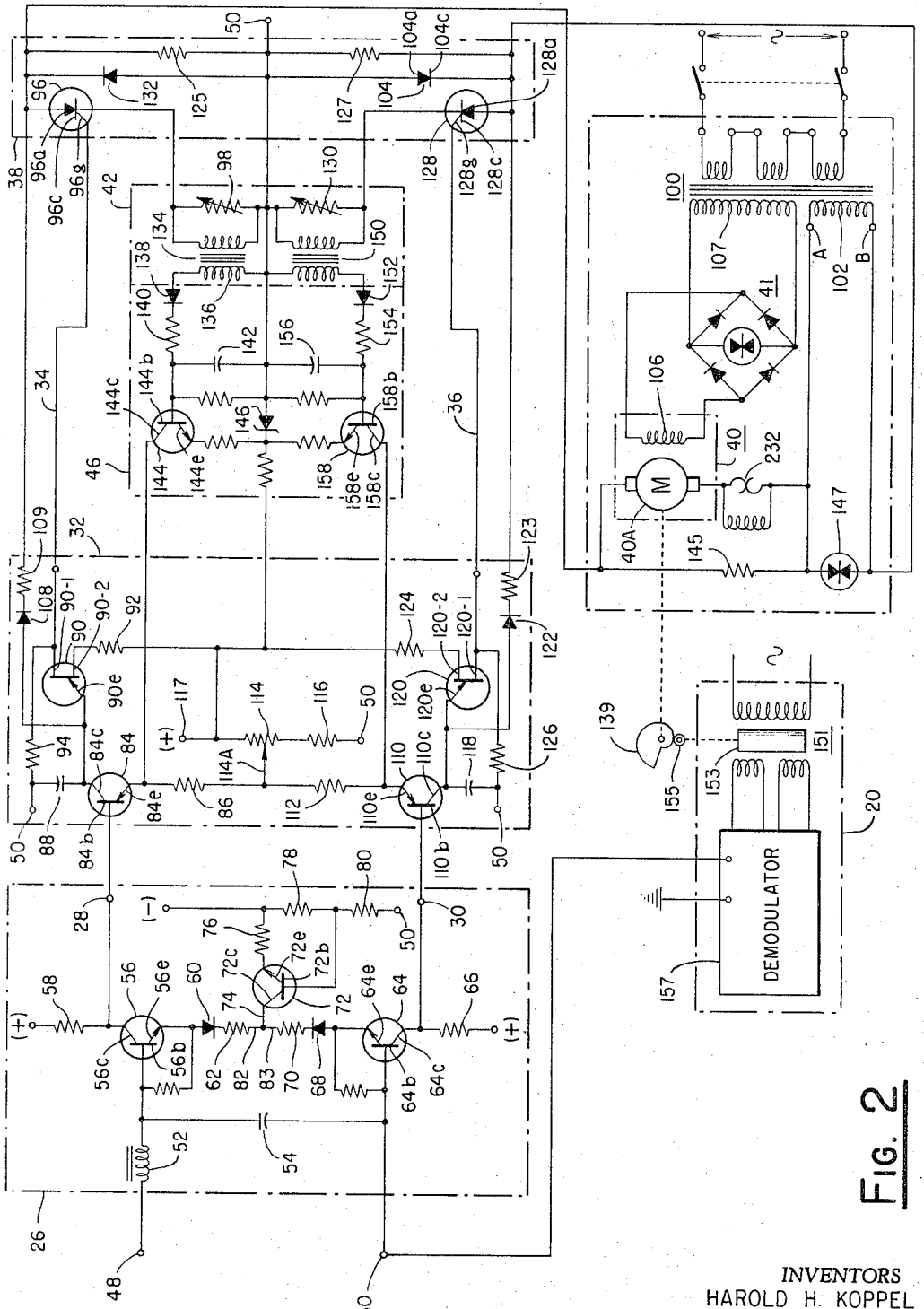
FIG. 2 is a schematic of our electronic control circuit including a torque limiting circuit.

Referring now to FIG. 2, we show a detailed schematic of the motor control circuit. Starting at the differential preamplifier 26, the output of the controller 14 during automatic mode is connected to terminal 48, and the output of the position transmitter 20 to the terminal 50. To prevent interference from unwanted noise signals an LC filter, consisting of an induction coil 52 and a capacitor 54, is connected between the input terminals. The filtered direct current signal from the controller 14 is applied to a base electrode 56b of an N-P-N transistor 56, while the filtered direct current signal from the position transmitter 20 is applied to the base electrode 64b of a transistor 64.

Connected to the collector electrode 56c through a biasing resistor 58 is a positive direct current supply. The emitter electrode 56e is connected to a constant current source through a reverse bias protection diode 60 and a current limiting resistor 62. Similarly, the collector electrode 64c of the transistor 64 is connected to a positive direct current supply through a biasing resistor 66. Likewise, the emitter electrode 64e is connected to the constant current source through a reverse bias protection diode 68 and a current limiting resistor 70. The constant current source includes an N-P-N transistor 72, a biasing resistor 76 connected to the emitter electrode 72e and a negative direct current supply. The base electrode 72b is driven by a fixed voltage determined by the ratio of resistors 78 and 80 connected between the negative direct current supply and common 50. In our system the terminal 50 is a common connection for various parts of the system. We indicated these connections by the numeral 50 to avoid undue complexity in the drawing.

According to Kirchhoff's equation the amount of direct current flowing away from a point in a circuit is equal to the amount flowing to that point. Therefore, as the current in line 74 is held constant, the current in lines 82 and 83 must vary inversely. In accordance with this principle if the signal at terminal 48 is positive with respect to the signal at 50, transistor 56 is driven further into its conduction region and the current in line 82 will increase while the current in line 83 will decrease and transistor 64 will be driven toward cut off. Conversely, if the signal at terminal 48 is negative with respect to that at terminal 50 the reverse will occur, the current in line 83 will increase while that in line 82 will decrease. When the signals at terminals 48 and 50 are equal, the current in line 74 will divide equally, transistor 56 and 64 conducting at the same level.

If terminal 48 is positive with respect to terminal 50 and transistor 56 driven further into its conducting state, the voltage at collector electrode 56c will change to increase the base drive on a P-N-P transistor 84 in the firing control section 32. For purposes of this description, we have related the P-N-P transistor 84 and its associated circuitry with the forward operating direction of the drive 24. Operating under this assumption, an increase in the base drive of transistor 84 will cause the electric drive 24 to operate in a forward direction. An increase in base drive at the base electrode 84b will cause an increasing current flow in the emitter electrode 84e which is connected to a sensitivity adjustment circuit (to be described later) through a biasing resistor 86. When current in the emitter electrode 84e increases there is a proportional increase in current flow through the collector electrode 84c which is connected to common 50 through an integrating capacitor 88. Since the collector electrode 84c is connected to the integrating capacitor 88, the collector voltage does not follow the base drive increase, instead it increases in accordance with the following equation:

$$E_c = \frac{1}{C}\int_{t_1}^{t_2} i\,dt \qquad (1)$$

where:

$E_c$ = the voltage at the collector electrode 84c.
$C$ = capacitance of the integrating capacitor 88.
$i$ = collector current.
$t$ = time.

From the above equation, it is apparent that a larger collector current produces a faster rising voltage at collector electrode 84c. Reviewing the circuitry so far described, the collector current of P-N-P transistor 84 is controlled by the voltage at the collector electrode 56c of transistor 56. In turn, the collector voltage of transistor 56 is controlled by the differential existing at terminals 48 and 50. Therefore, the voltage at collector electrode 84c is directly controlled by the differential potential existing at terminals 48 and 50.

Connected to the collector electrode 84c is an emitter electrode 90e of a unijunction transistor 90. The base electrode 90–2 of the unijunction transistor 90 is connected to a regulated positive direct current supply 117 through a biasing resistor 92. The base electrode 90–1 is connected to common 50 through a biasing resistor 94. Although the operation of unijunction transistors is generally well known, a brief discussion on their operation will help clarify our circuit. Basically, the operation depends upon the modulation of the conductivity of the silicon between the emitter electrode and the base-1 electrode. When the voltage difference is below a firing voltage, the current flow from base-1 to base-2 is very low. Upon reaching the firing voltage the unijunction transistor goes into a conducting state. The firing voltage is proportional to the supply voltage on the base-2 and is the reason for using a regulated positive direct current supply.

The voltage of collector electrode 84c and consequently the firing voltage varies in accordance with Equation 1. When the voltage at the collector electrode 84c reaches the firing voltage the unijunction transistor 90 is forward biased and conducts discharging the capacitor 88 and transmitting a voltage pulse to a gate electrode 96g of a silicon controlled rectifier 96 of the power control section 38. Basically, silicon control rectifiers are P-N-P-N semiconductors with three rectifying diodes. Conduction between the anode and cathode occurs by introducing a low level gate to the cathode electrode with the anode positive but at less than the breakdown voltage. A silicon controlled rectifier, like any ordinary rectifier, returns to its blocking state when the anode voltage goes negative with respect to the cathode. In our circuit the cathode electrode 96c is connected to ground through a variable resistor 98 of the current sensing circuit 42. The resistor 98 has a small resistance and the cathode electrode 96c may be considered as being at ground potential.

Connected to the anode electrode 96a through the armature winding 40a of the direct current motor 40 is terminal A of a secondary winding 102 of a power transformer 100, energized from a suitable source of alternating current. Connected to terminal B of the secondary winding 102 is a rectifying element 104 having its anode 104a also connected to common 50.

As the unijunction transistor 90 goes into a conducting state the voltage pulse established at its base 90–1 is sufficient to gate the silicon controlled rectifier 96 into a conducting state if the anode 96a is positive with respect to the cathode 96c. Current now flows from terminal A through the armature winding 40A, the silicon controlled rectifier 96, the resistor 98, diode 104 to terminal B of secondary 102. Since field winding 106 of motor 40 is continuously energized through a suitable rectifier 41, by a secondary winding 107 of the power transformer 100, the armature 40A rotates to position the output drive arm 22 in a forward direction. Conduction of the silicon controlled rectifier 96 continues until the anode 96a becomes negative with respect to the cathode 96c, which occurs during the half cycle of the alternating current supply when the anode 96a is negative with respect to the cathode 96c.

To position the drive 24 in a reverse direction, a circuit identical to the one previously described is provided. Assume the signal from the controller 14 applied to terminal 48 is negative with respect to terminal 50, transistor 64 is driven into its conducting state thereby increasing the base drive on a transistor 110. As in the forward direction circuit the emitter electrode 110e is connected to a sensitivity adjustment circuit (to be described later) through a biasing resistor 112. The collector electrode 110c is connected to an integrating capacitor 118 and an emitter electrode 120e of a unijunction transistor 120. The base electrode 120–2 of the transistor 120 is connected through a biasing resistor 124 to the constant voltage direct current supply 117. The base 120–1 is connected to common 50 through a biasing resistor 126 and to the gate electrode 128g of a silicon controlled rectifier 128. To complete the reverse positioning circuit the cathode electrode 128c is connected through a variable resistor 130 to common 50 and from common 50 through diode 132, armature 40a, secondary winding 102 to the anode 128a.

With alternating current applied across the silicon controlled rectifiers 96 and 128, it is apparent that the firing of unijunction transistors 90 and 120 must be properly synchronized therewith. Thus, when terminal 48 is positive with respect to terminal 50 during each half cycle when the anode 96a is positive with respect to the cathode 96c, the unijunction transistor 90 should fire and fire at a point in each such half cycle varying inversely with the potential difference between terminals 48 and 50. Likewise when terminal 50 is positive with respect to terminal 48, during each half cycle when the anode 128a is positive with respect to the cathode 128c the unijunction transistor 120 should fire and fire at a point in each such half cycle varying inversely with the potential difference between terminals 50 and 48. This operation we accomplish by starting the integrating cycle of capacitors 88 and 118 simultaneously with the start of the half cycle when the anode 96a and the anode 128a respectively is positive with respect to its associated cathode.

Specifically, during each half cycle when terminal A is positive with respect to terminal B, the latter is clamped to common potential through diode 104 to which emitter electrode 120e is connected through diode 122 and resistor 123 thus permitting capacitor 118 to completely discharge. At the start of the half cycle when terminal B is positive, diodes 122 and 104 become back biased thereby starting the integration cycle of capacitor 118. While terminal A is negative with respect to terminal B, a diode 108 connected to common 50 through resistor 109, and diode 132 are forward biased and thereby maintain emitter electrode 90e at substantially common potential. At the start of the following half cycle when terminal A becomes positive, diodes 132 and 108 are back biased thereby starting the integrating cycle of capacitor 88. Advantageously, resistors such as shown at 125 and 127 are employed in the synchronizing circuits.

FIGS. 3A–3C illustrate the operation of the control circuit when terminal A is positive with respect to terminal B so that the drive is operated in a forward direction. FIG. 3A shows the alternating current voltage at the secondary 102 of power transformer 100. The voltage at terminal A is shown in solid line and that at terminal B in dash line. FIG. 3B shows the voltage at collector 84c. It will be noted that this voltage increases at a substantially constant rate as capacitor 88 charges and then drops substantially instantaneously as unijunction transistor 90 fires and thereafter remains slightly positive, due to the clamping action of resistor 94, for the duration of the half cycle that terminal A is positive. At the start of the negative half cycle and for the duration thereof, the voltage decreases to and remains at zero due to the action of the synchronizing circuit previously described. This operation is repeated during each half cycle so long as terminal 48 is positive with respect to terminal 50.

At the instant unijunction transistor 90 fires, silicon control rectifier 96 is rendered conducting and a pulse of current, as shown in FIG. 3C, passes through the anode circuit thereof which includes the armature 40A thereby producing rotation of the motor 40 in a forward direction.

When terminal 50 is positive with respect to terminal 48 the operation is as depicted in FIGS. 3A, 3D and 3E, resulting in operation of the motor 40 in reverse direction.

As the voltage between terminals 48 and 50 increases, the rate at which the voltage increases at collectors 84c or 110c, as the case may be, will increase proportionally. Unijunction transistor 90 or 120 will fire earlier during each operative half cycle and increase the current pulse through the armature winding 40A thereby increasing the speed of rotation of the motor 40 in a forward or reverse direction. Conversely as the voltage between terminals 48 and 50 decreases, unijunction transistor 90 or 120, as the case may be, will fire later during each operative half cycle thereby causing motor 40 to rotate at slower speed.

With zero voltage between terminals 48 and 50, we preferably arrange the circuit so that just before the end of each positive half cycle unijunction transistors 90 and 120 fire thereby producing successive momentary current pulses in opposite directions through armature winding 40A. This arrangement provides a control circuit of high sensitivity so that response is obtained from minute voltages between terminals 48 and 50. Such operation is depicted by dash lines 133 and 135 in FIGS. 3B and 3D respectively.

At a given voltage between terminals 48 and 50, depending upon the adjustments and constants of the circuits, capacitors 88 and 118 will charge at a maximum rate and no further increase in speed of motor 40 will be obtained for greater voltages. This operation is shown by dash lines 137 and 139 in FIGS. 3B and 3D. Thus, for any voltage between terminals 48 and 50 above a predetermined value, motor 40 will rotate at maximum speed, and as the voltage decreases below the predetermined value the motor speed will decrease proportionally so that the null condition, when zero voltage exists between terminals 48 and 50, is approached asymptotically thereby avoiding over-shooting and hunting of the motor.

We have found that satisfactory results are obtained by having unijunction transistors 90 and 120 fire approximately 20° after the start of each positive half cycle when the voltage between terminals 48 and 50 is above the predetermined value and this value is approximately 3% of signal range. Similarly, we have found that satisfactory results are obtained if, with zero voltage between terminals 48 and 50, unijunction transistors 90 and 120 each fire approximately 3° before the end of each positive half cycle. By means of the sensitivity adjustment previously mentioned and now to be described these limits may be adjusted to suit the control drive to any particular application. Thus, in some cases with zero voltage between terminals 48 and 50 it may be desirable to eliminate the pulse through armature 40A at the end of each half cycle thereby establishing a "dead band" so that motor 40 remains stationary even though a relatively small voltage may exist between terminals 48 and 50. Similarly, the predetermined voltage between terminals 48 and 50 above which capacitors 88 and 118 charge at maximum rate may be adjusted to suit the conditions of any particular application.

The rate at which capacitors 88 and 118 charge and accordingly the Max. and Min. current pulses through armature winding 40A may be varied, for example, by means of the sensitivity adjustment we provide and previously mentioned. This is shown in FIG. 2 and comprises a constant positive potential source 117 connected to common 50 through potentiometer 114 and fixed resistance 116. Adjusting tap 114A upwardly, as shown in the drawing, increases the rate at which capacitors 88 and 118 will charge for a given base drive on bases 84b and 110b. Conversely, adjustment downwardly will decrease the rate at which capacitors 88 and 118 will charge for a given base drive on bases 84b and 110b.

Should the direct current motor 40, as it is positioning the drive arm 22 in the forward direction, draw an excessive amount of current a significant voltage drop will be developed across resistor 98. Connected across the terminals of resistor 98 is a primary winding of an isolating transformer 134. One terminal of the secondary winding 136 is connected to common 50 and the other terminal connected to the anode of rectifier 138. After half wave rectification the the secondary voltage is applied to the base electrode 144b of transistor 144 and to a time delay network consisting of a resistor 140 and a timing capacitor 142. Connected to the emitter electrode 144e is the cathode electrode of a Zener diode 146, the anode electrode thereof being connected to common 50. When the base drive voltage on transistor 144 exceeds the breakdown voltage of the Zener diode 146 conduction will occur through the collector-emitter path. This conduction is adjusted to take place when the armature current in armature 40A reaches 125% of rating. As shown collector 144c is connected to emitter 84e and accordingly when transistor 144 is conducting the charging time of integrating capacitor 88 is held at a value such as to limit the current through armature 40A to about 125% of rating.

A similar current limiting circuit is provided to protect the motor in reverse direction. In the reverse direction the sensing resistor 130 develops a voltage drop which is transformer coupled through a second isolating transformer 150 to a rectifier 152, a transistor 158 and a time delay circuit consisting of resistor 154 and a capacitor 156. After the base electrode 158b of a transistor 158 becomes more positive than the breakdown voltage of Zener diode 146 conduction takes place through the collector-emitter junction thereby reducing collector current of transistor 110 and increasing the charging time of the integrating capacitor 118. The motor current is reduced by the increased charging time as explained in describing the forward protection circuit.

As shown diagrammatically in FIG. 2, the position transmitter 20 includes a cam 139 angularly positioned as motor 40 rotates. A movable core transformer 151, energized from a suitable source of alternating current, is provided with a movable core 153 having a follower 155 engaging cam 139. As cam 139 rotates the core 153 is positioned thereby varying the coupling between the primary and secondary winding of transformer 151. An alternating current signal is thereby produced in the secondary winding proportional to core position and which is demodulated and ranged in a demodulator 157 and transmitted to terminal 50. Any desired relationship, linear or nonlinear, may be obtained between the signal at terminal 50 and position of drive arm 22 by shaping cam 139. Thus, any desired relationship may be established between the signal at terminal 48 and position of drive arm 22. For a more complete description of a movable core transformer with a demodulated output signal, reference may be made to the patent application of Harold H. Koppel et al., filed Sept. 14, 1962, Ser. No. 223,742, now Patent 3,225,289.

In some instances, due to the delay caused by the motor 40, it may be desirable to provide a resistance, such as shown at 145 around armature 40A to insure continued conduction of the silicon controlled rectifiers 96 and 128 after initiation by the trigger pulse from its unijunction transistor 90 and 120 respectively. To provide the circuit against excessive voltage transients, a protective device such as a Thyrector, shown at 147 may be connected across terminals A and B.

In FIG. 4, which illustrates further features of our control circuit, we show transmitter 10 connected to a summing junction 160 included in the Selector Station 12. Within the summing junction 160 is a direct current supply 162 and parallel resistors 164 and 166. Resistor 164 is provided with a center tap 165 to which is connected transmitter 10. Resistor 166 is provided with a movable contact 168 adjustable from manually operable knob 167 to establish the setpoint. Selector Station 12 also includes an indicating meter 172 connected to a two-position switch 174 for indicating the output of the transmitter 10 when in one position (as shown) or that of the position transmitter 20 when in the other position.

To transfer the system from the automatic to remote manual mode or vice versa the Selector Station 12 includes two pushbuttons 176 and 178. Pushbutton 176 has normally open contact which when closed transfers the system from remote manual to automatic. Pushbutton 178 is normally closed and upon opening transfers the system from automatic to remote manual. Selector Station 12 also incorporates a switch 180 for remote manual positioning of the drive 24.

The algebraic sum of the output signal from the transmitter 10 and the setpoint signal established at contact 168 is applied to an input terminal 182 of controller 14. If the algebraic sum is equal to zero then the variable measured by transmitter 10 is at the setpoint value. If the signal representing the algebraic sum is above or below zero it is an indication that the measured variable is proportionately above or below the setpoint value. The error signal then transmitted to terminal 182 is effective for positioning drive 24 as previously described. Ordinarily, the drive 24 will operate to position a damper or a valve or other final control element to vary a corrective agent to restore the measured variable to the setpoint value.

Controller 14, as mentioned earlier, includes a high gain amplifier A and a feedback circuit which may include a feedback capacitor 184 and a feedback resistor 186. Such a feedback circuit characterizes the output signal of controller 14 as, "proportional plus reset." Omission of the capacitor 184 will provide an output signal from controller 14 characterized as "proportional" whereas omission of the feedback resistor 186 will characterize the output signal as "reset." Included in the controller 14 is an input resistance 192. It is also provided with a gain adjustment 183, to vary the proportionality between changes in input signal and immediate resulting changes in output signal, as well as a reset adjustment 190 to vary the reset rate or as it is commonly termed "repeats per minute."

Following the teachings of United States patent to Harold H. Koppel, No. 3,068,387, during periods of remote manual operation the output signal of controller 14 is transmitted through a switch $K_1$ to a terminal 197 between capacitor 184 and feedback resistor 186. The signal from position transmitter 20 is transmitted through a normally closed switch $C_2$ to a terminal 195 connected to the opposite side of capacitor 184. Thus, during periods of remote manual operation the regenerative action of capacitor 184 is inhibited, and the potential on the opposite side of the capacitor 184 is maintained equal to the output signal from position transmitter 20. Thus, transfer from remote manual to automatic can be accomplished without "bumping" the system which would be the case if at the instant of transfer the output signal of controller 14 differed from that of position transmitter 20.

When the system is in remote manual normally closed contacts $C_2$ also short terminals 48 and 50 at the input to preamplifier 26 thereby holding the terminals at equal potential. A pair of normally open contacts $C_3$ and $C_4$ disconnects the preamplifier 26 and firing control section 32 from the silicon controlled rectifiers 96 and 128.

Positioning the drive 24 with the system in remote manual is accomplished by applying a signal, originated by a closure of switch 180 to the "F" (forward) position or to the "R" (reverse) position. When switch 180 is closed to the "F" position a relay coil F is energized by a direct current source 225 causing closure of contact $F_1$. Control electrode $96g$ is then connected to the anode $96a$ through resistor 223. Thereafter so long as contact $F_1$ remains closed, silicon controlled rectifier 96 will conduct throughout each half cycle of the alternating current supplied by the secondary 102 when the anode $96a$ is positive with respect to the cathode $96c$.

When switch 180 is closed to the "R" (reverse) position a relay coil R is energized effecting closure of contact $R_1$ and placing control electrode $128g$ in circuit with the anode $128a$ through a resistor 227. Diodes 220 and 226 protect the silicon controlled rectifiers 96 and 128 respectively from excessive negative potentials of the control electrodes $96g$ and $128g$ with respect to cathodes $96c$ and $128c$.

Transfer of the drive from remote manual to automatic is effected by momentarily closing contact 176 energizing relay solenoid K positioning switches $K_1$ and $K_2$ to the "A" position. Closure of switch $K_2$ to the "A" position energizes a time delay relay C which after a 0.2 second time delay closes contacts $C_1$, $C_3$, $C_4$ and $C_5$, and opens contacts $C_2$ and $C_6$. The purpose of the time delay relay C in providing the 0.2 second time delay is to permit stabilization of the system at the level of signal established by position transmitter 20.

Closure of contacts $C_3$ and $C_4$ connects the control electrodes $96g$ and $128g$ to the trigger circuits of firing control section 32. Opening of contacts $C_2$ renders the preamplifier 26 responsive to differences between input signals appearing at terminals 48 and 50. Closure of hold-in contact $C_1$ maintains relay coil K energized after pushbutton 176 is released. Opening of contact $C_6$ disconnects switch 180 from the direct current supply 225 thereby preventing relay coils F and R from being energized while the system is in the automatic mode.

Transfer of the drive from automatic to remote manual is effected by momentary opening of pushbutton 178 thereby de-energizing relay K causing immediate operation of the contacts $K_1$ and $K_2$. Operation of contact $K_2$ to the H position de-energizes relay C causing immediate operation of the contacts operated thereby comprising contacts $C_1$, $C_2$, $C_3$, $C_4$, $C_5$, and $C_6$ as no time delay is required in transferring from automatic to remote manual.

Advantageously, a signal light 229 is provided which is energized so long as a source of current is available. A signal light 231 is also provided to indicate that the system is in the automatic mode; being energized by momentary closure of pushbutton 176 and thereafter while hold-in contact $C_1$ of time delay relay C is closed.

Another feature of our system is an overload protection circuit. A manual reset thermal overload device 232 is connected in series with the armature winding 40A. Connected in parallel with the thermal overload device 232 is a relay coil X which when energized opens a normally closed contact $X_1$. During normal motor operation the armature current flows through the device 232 and the relay coil X is de-energized. When the thermal device opens, due to excessive armature current, full armature current flows through relay coil X causing the normally closed contact $X_1$ to open.

Inasmuch as the normally closed contact $X_1$ is connected between the power source 225 and time delay relay C de-energization thereof will be effected when relay coil X is de-energized. De-energization of time delay relay C will cause contact $C_1$ to open thereby de-energizing relay coil K throwing the control, if in the automatic mode, to the remote manual mode. Before the system may again be placed in the automatic mode it is necessary to manually reset the device 232 and then momentarily close contact 176. Without the system going to remote manual mode when device 232 is actuated would permit a system "bump" as during the time the device 232 is open and armature 40A de-energized the output signal of controller 14 could change considerably.

Advantageously to limit drive travel in the forward and reverse directions we provide an adjustable forward limit switch FL and an adjustable reverse limit switch RL operated by a cam operatively connected directly or indirectly to the rotor 40A. Normally the switches FL and RL are closed thereby energizing relay coils W and Y respectively. Upon switch FL being opened coil W is de-energized opening a contact $W_1$, thereby inhibiting further drive operation in the forward direction while permitting operation in the reverse direction. Opening of switch RL causing de-energization of relay coil Y opens a contact $Y_1$ thereby inhibiting further drive operation in the reverse direction while permitting operation in the forward direction.

Under certain load conditions it may be possible to position the drive backwards through the drive arm 22. This occurs when the device is de-energized for one reason or another and the load carried by the drive arm 22 overcomes the internal friction and mechanical advantage of the drive mechanism. To prevent such an occurrence we provide a solenoid operated mechanical brake which holds the drive in any desired position. The mechanical features of the brake are described in a co-pending application filed in the name of Gardner L. Campbell et al., Ser. No. 313,461, dated Oct. 3, 1963. The brake is engaged (1) upon a power failure; (2) when the system is in remote manual operation, except when switch 180 is closed in the "F" or "R" position and (3) when the drive trips an upper or lower limit switch FL or RL.

As shown schematically in FIG. 4 and as being representative of any suitable brake, a brake $H_1$ is held out of engagement with a shaft 234 driven by the rotor 40 so long as a solenoid coil H is energized. It will be noted that solenoid coil H is energized while the control is in automatic by virtue of contact $C_5$ being closed; but de-energized while the control is in remote manual by virtue of contact $C_5$ being opened. When, however, switch 180 is closed to the F or R position coil H is energized through a diode 244 or 246 thereby releasing the brake for remote manual positioning.

Coils W or Y upon de-energization due to opening of switch FL or RL respectively also de-energize coil H by opening normally closed contact $W_2$ or $Y_2$ as the case may be.

What we claim as new and desire to secure by Letters Patent of the United States is:

1. In a control circuit for an electrically operated control drive, comprising in combination, a control drive including an output drive arm and a direct current motor positioning said drive arm having a field winding and an armature winding, a continuously energized direct current circuit including said field winding, a continuously energized alternating current circuit including said armature winding, a first control means for controlling the direction of the current in said alternating current circuit, a second control means for controlling the direction of the current in said alternating current circuit, an electric relay having contact means effective in one position to render said first control means operative to control the direction of the current in said alternating current circuit and in a second position to render said second control means operative to control the direction of current in said alternating current circuit and thermal cut out means responsive to the current in said armature winding transferring said relay means from said one position to said second position to thereby render said first control means inoperable and said second control means operative.

2. In a control circuit for an electrically operated control drive, comprising in combination, a control drive including an output drive arm and a direct current motor positioning said drive arm having a field winding and an armature winding, a continuously energized direct current circuit including said field winding, a continuously energized alternating current circuit including said armature winding, automatic means for controlling the current in said armature winding, manual means for controlling the current in said armature winding, manually operable means for selectively rendering said automatic means or said manual means operable to control the current in said armature winding, thermal cut out means responsive to the current in the armature winding and operable at a predetermined value thereof transferring control from said automatic means to said manual means and simultaneously opening said alternating current circuit and including manually operable means for closing said alternating current circuit.

3. In a control circuit for an electrically operated control drive, comprising in combination, a control drive including an output drive arm and a direct current motor positioning said drive arm having a field winding and an armature winding, a continuously energized direct current circuit including said field winding, a continuously energized alternating current circuit including said armature winding, a silicon controlled rectifier element having a cathode, an anode and a gate electrode, said cathode and anode connected in said alternating current circuit to thereby permit a pulsating direct current to pass through said alternating current circuit during the remainder of each half cycle following triggering of said gate electrode by an energizing pulse, means generating a first control signal, means generating a second control signal corresponding to the position of said output drive arm, a differential preamplifier for generating an error signal corresponding to the difference between said first and second control signals, means under the control said error signal connected to said gate electrode generating said trigger impulse to effect rotation of said motor to maintain said first and second control signals equal, manually operable means for disconnecting said last named means from said gate electrode and including manually operable means for establishing said trigger pulse to effect rotation of said motor.

4. In a control circuit for an electrically operated control drive, comprising in combination, a control drive including an output drive arm and a direct current reversible electric motor positioning said drive arm in forward and reverse directions having a field winding and an armature winding, a continuously energized direct current circuit including said field winding, a continuously energized alternating current circuit including said armature winding, a first silicon controlled rectifier element having a cathode, an anode and a gate electrode, said cathode and anode connected in said alternating current circuit to thereby permit a pulsating direct current to pass through said alternating current circuit during the remainder of each half cycle following the triggering of said gate electrode by an energizing pulse to effect operation of said motor in the forward direction, a second silicon controlled rectifier element having a cathode, an anode and a gate electrode, said cathode and anode connected in said alternating current circuit to thereby permit a pulsating direct current to pass through said alternating current circuit during the remainder of each half cycle following the triggering of said gate electrode by an energizing pulse to effect operation of said motor in the reverse direction, an electronic amplifier for generating the pulses connected to said gate electrodes, manually operable contact means for generating the pulses and manually operable switch means for disconnecting said electronic amplifying means from said gate electrodes and connecting said contact means to said gate electrodes.

5. A direct current motor control circuit, comprising, a direct current motor having an armature winding and a continuously energized field winding, a power supply having a direct current output connected to said field winding to provide continuous energization thereof, said power supply also including an alternating current output voltage connected to said armature winding, a silicon controlled rectifier having a gate terminal, a cathode electrode and an anode electrode, said anode and cathode electrodes connected in circuit with the armature winding of said direct current motor, a current sensing means connected in circuit with said armature winding, said current sensing means responsive to armature current flow, a unijunction transistor having an anode electrode, a base-2 electrode and a base-1 electrode, said base-1 electrode connected to the gate terminal of said silicon controlled rectified for controlling the conduction thereof, a transistor having a base, emitter and collector electrodes, said collector electrode connected to a timing capacitor and the anode electrode of said unijunction transistor for controlling the base-1 to base-2 conduction, and means responsive to said current sensing means and connected to the emitter electrode of said transistor to control the emitter-collector current flow.

6. A direct current motor control circuit as set forth in claim 5 wherein said current sensing means is a resistor producing a voltage varying in proportion to the current in said armature winding.

7. A direct current motor control circuit as set forth in claim 6 wherein said responsive means includes a transformer having a primary winding connected across said sensing resistor and a secondary winding connected to control the emitter-collector current of said transistor.

8. A control circuit for positioning the drive arm of a control drive, comprising, a direct current motor connected to position the drive arm, said direct current motor having an armature winding and a continuously energized field winding, a two terminal alternating current power supply, one terminal of said supply connected to said armature winding, a position transmitter connected to respond to the position of said drive arm and establish a signal proportional thereto, an amplifying means having dual input and output circuits, one of said input circuits connected to receive the signal established by said position transmitter and the second input connected to receive a signal proportional to the desired position of said drive arm, said amplifying means including means for comparing the magnitude of said signals and amplifying the difference therein, and having two transistors each with a base, emitter and collector electrodes, said emitter electrodes connected together to a constant current source thereby limiting the combined emitter-collector current flow in both transistors to a fixed value, a first triggering means connected to one of said dual output circuits and sensitive to the amplified difference signal calling for forward positioning of said drive arm, a second triggering means connected to the second of said dual output circuits and sensitive to an amplifier difference signal calling for reverse positioning of said drive arm, a first controllable rectifying means connected to said armature winding, the second terminal of said two terminal power supply and said first triggering means, said rectifying means being triggered into a conduction state at periodic intervals thereby completing a current path from said power supply through said armature winding causing rotation of said armature in a forward direction, the timed duration of said conduction state being dependent upon and controlled by the magnitude of said difference signal, a second controllable rectifying means connected to said armature winding, the second terminal of said two terminal power supply and said second triggering means, conduction of said second rectifying element likewise completing a current path to said armature winding thereby causing rotation in the reverse direction.

9. A control circuit for positioning the drive arm of a control drive as set forth in claim 8 including a first synchronizing means connected between said first triggering means and said power supply for synchronizing the forward direction trigger signal with said alternating voltage and a second synchronizing means connected between said second triggering means and said power supply for synchronizing the reverse direction trigger signal with the alternating voltage.

10. A control circuit for positioning the drive arm of a control drive as set forth in claim 9 including a current sensing means responsive to current in said armature winding and a trigger inhibiting means sensitive to said current sensing means for inhibiting the triggering of said controllable rectifying means.

References Cited
UNITED STATES PATENTS

| | | | |
|---|---|---|---|
| 2,673,314 | 3/1954 | MacCallum | 318—28 |
| 2,679,022 | 5/1954 | McIlhenny | 318—28 |
| 2,753,499 | 7/1956 | Dion | 318—29 |
| 2,828,458 | 3/1958 | Quallen et al. | 318—19 |
| 2,852,667 | 9/1958 | Haines | 318—472 |
| 3,068,387 | 12/1962 | Koppel | 318—28 |
| 3,069,554 | 12/1962 | Decker | 318—489 |
| 3,177,418 | 4/1965 | Meng | 318—331 |
| 3,188,542 | 6/1965 | Dietrich | 318—28 |
| 3,192,466 | 6/1965 | Sylvan et al. | 323—22 |
| 3,204,113 | 8/1965 | Snygg | 318—18 |

BENJAMIN DOBECK, *Primary Examiner.*

ORIS L. RADER, *Examiner.*